3,559,288
DENTAL FILLINGS AND DEVICES COMPOSED OF A POLYCARBONATE FILLED WITH PRESIZED GLASS FIBERS
Hans-Joachim Rehberg, Leverkusen, Hermann Schnell, Krefeld, Wilhelm Hechelhammer, Krefeld-Bockum, and Hugo Streib, Krefeld-Urdingen, Germany, assignors to Farbenfabriken Bayer Aktiengesellschaft, Leverkusen, Germany, a corporation of Germany
Continuation of application Ser. No. 472,057, July 14, 1965. This application July 16, 1969, Ser. No. 846,638
Claims priority, application Germany, July 15, 1964, F 43,440
Int. Cl. A61c *13/00*
U.S. Cl. 32—2                                    13 Claims

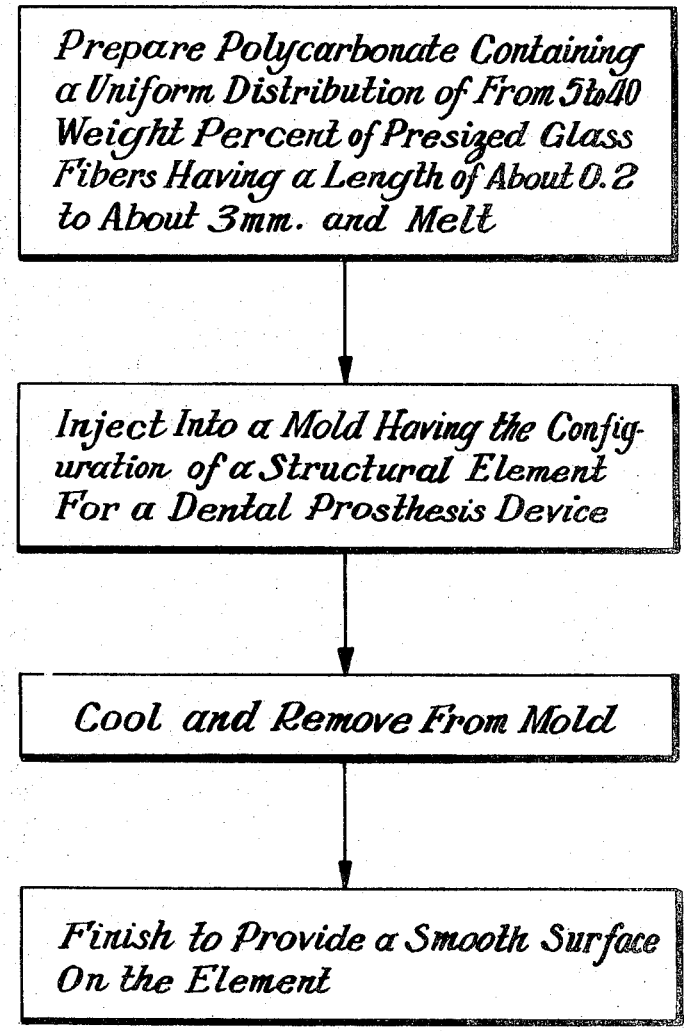

ABSTRACT OF THE DISCLOSURE

A dental filling or dental prosthesis device having an essential structural element composed of a thermoplastic, high molecular weight polycarbonate and from 5 to 40 percent glass fibers presized with a thermoplastic, high molecular weight polycarbonate or water and a method of making same.

CROSS-REFERENCE TO RELATED APPLICATIONS

This application is a continuation of application Ser. No. 472,057 filed July 14, 1965.

The present invention relates to a novel composition for use in producing dental prosthesis devices and fillings. More particularly the invention relates to the use of high molecular weight polycarbonates in combination with water or polycarbonate presized glass fibers to produce such dental aids.

It is known generally to add fibers, especially glass or quartz, to high molecular weight polymeric acrylate or methacrylate powder preparations customarily used in dental practice, as well as to the corresponding monomers. Such additions improve somewhat the impact, breaking and bending strength of dental fillings and dental prosthesis devices produced therefrom. Fibers of more than 1 cm. in length, however, cannot be used for this purpose, since they result in considerable difficulties in working up the resulting mixtures. Furthermore, shorter fibers of about 1 to 5 mm. length usually employed show a poor adhesion to the acrylic polymer and reduce its strength. Processes have therefore been discovered for obtaining an improved bond between the fiber and the acrylates or methacrylates by a chemical or physical roughening of the fibre surfaces.

The incorporation of glass fiber fabric into dentures has also been described, but the use thereof is only of advantage if the fabrics are placed exactly on the areas of the denture which are subjected to tensile stress. However, such an exact placing of the fabrics is practically impossible due to the manual stopping method generally applied and sometimes to the extreme thinness of the dentures (about 1 to 1.5 mm.). If the fiber fabrics are not located in these areas of tensile stress, the strength of the dentures is reduced.

For these reasons, none of these proposed methods has found wide acceptance in practice.

It is also known to produce dental fillings and prosthesis devices from high molecular weight polycarbonates and mixed polycarbonates produced from aromatic dihydroxy compounds. Such polycarbonates can be worked up thermoplastically and present certain advantages over polymers of the acrylate or methacrylate type, which are worked up by the powder-liquid method. It is desirable, however, to improve the properties of the fillings and prosthesis devices made from these polycarbonates, for example, their hardness, elasticity modulus and thermal expansion coefficient.

According to the invention, it has now been found that a high molecular weight polycarbonate or mixed polycarbonate filled with glass fibers, which fibers have originally been sized with polycarbonate or water, preferably water-sized filamented milled glass fibers, exhibits the desired property improvements. The addition of such glass fibers in quantities of 5 to 40, especially of about 10 to 30, percent by weight does not noticeably affect the flow or the mould-filling properties of the melted polycarbonate. The dental material according to the present invention is useful in the production of fillings and dental prosthesis devices such as dentures, bridges, crowns, etc.

The drawing herein is a flow diagram of one embodiment according to the invention wherein polycarbonate containing presized glass fibers is injection molded to produce a structural element for a dental prosthesis device.

Compared with a polycarbonate which does not contain glass fibers, the mould shrinkage is reduced from a value of about 0.7–0.8% to a value of about 0.2–0.5%. This means that the finished dental fillings and dentures fit even better than the previously used unfilled polycarbonate.

Furthermore, a polycarbonate reinforced with, e.g., 30% by weight glass fiber, has a thermal expansion coefficient of only $26 \times 10^{-6}$. This is compared with a coefficient of $60$–$70 \times 10^{-6}$ of nonreinforced polycarbonate. Consequently, dental fillings, for example, show approximately the same behaviour with changes of temperature of up to 60–70° C. occurring in the mouth, as do the natural hard tooth substance. A change of temperature therefore does not lead to cracks at the edges of the filling, which can cause secondary caries. Moreover, the risk of the coated metal or porcelain parts of a denture becoming loose no longer exists.

The bending strength or bending stress of the fiber filled or reinforced polycarbonate fillings and dentures according to the invention is increased by the factor 1.5 and the elasticity modulus by the factor 3. The glass fiber reinforced polycarbonate is thus also substantially stiffer than the nonreinforced material. In this respect it has far greater than twice the value of the previously used polyacrylates or methacrylates. Consequently, the risk of an orthodontic effect of the denture, i.e., undesirable changes in the position of the remaining teeth, is considerably reduced. The greater stiffness is also of advantage when the material is used for dental fillings.

Furthermore, the increase of the ball indentation hardness from about 850–1000 kp./sq. cm. to about 1450 kp./sq. cm. brings about an improved abrasion resistance when the fillings or dentures are used or when they are cleaned with toothbrushes or polishing pastes.

Finally, a considerable security against crack formation exists in the case of a particularly critical stress, for example, in coated metal or porcelain parts, or if the conditions of processing are not meticulously met. A very good behaviour of the fillings and dentures is observed, even under the influence of surface-active substances.

It is surprising that dental prosthesis devices produced according to the invention by injection moulding from glass fiber reinforced polycarbonate in suitably insulated plaster moulds, have a smooth and glossy surface. The glass fibers contained in the synthetic material are not noticeable on the surface, not even after whatever finishing operations are necessary.

Polycarbonates and mixed polycarbonates which are suitable according to the invention for dental fillings and dentures and the production thereof are described in greater detail, for example, in German patent specifications Nos. 971,790, 971,777 and 1,011,148. Polycarbonates with a relative viscosity of about 1.20 to 1.40, particularly of about 1.25 to about 1.32, measured in a 0.5% methylene chloride solution at 20° C., are preferred.

Details regarding polycarbonate-sized glass fiber material can be found in Belgian patent specification No. 651,321 and in corresponding United States application S.N. 386,738 filed July 31, 1964, now U.S. Pat. 3,408,225.

A high molecular weight polycarbonate or mixed polycarbonate having a content of preferably up to 25 mol percent, referred to the total content of radicals of dihydroxy compounds, of β-alkenyl-substituted aromatic dihydroxy compounds, is especially suitable for the sizing of glass fiber material. In particular a copolymer containing about 0.5 to about 5 mol percent of radicals of 2,2-bis(4-hydroxy-3-allylphenyl)-propane and about 99.5 to about 95 mol percent of radicals of 2,2-bis-(4-hydroxyphenyl)-propane and/or 1,1-bis-(4-hydroxyphenyl)-cyclohexane may be used.

A polycarbonate granulate with a content of glass fibers of the stated type may be produced by adding the glass fiber material into the melt of the polycarbonate, dispersing it uniformly therein, e.g., in a worm extruder, drawing the resultant mixture in the form of bristles and chopping these into granules, as described in Belgian patent specification No. 642,285. If desired, it is also possible to start with glass filaments which have not been previously chopped, for example, from rovings or staple fiber strands. The strands open during incorporation with the viscous melt, and the glass fibers are comminuted to a length of 0.2 to about 3 mm. and a diameter of 0.001 mm. to about 0.015 mm., preferably 0.009 mm. and distributed in the melt, irregular in size but uniform in distribution. When the granulate is worked up, there occurs no accumulations of glass fibers in the nozzle of the injection moulding machine or undissolved flocks in the injection moulded part. To the contrary, there are obtained fillings and dentures in which the glass fibers are distributed completely uniformly, and whose surfaces are particularly smooth and even, as mentioned previously.

A process for the production of a glass fiber-containing granulate from high molecular thermoplastic polycarbonates with the use of water-sized filamented milled glass fibers, which can also be used according to the invention with advantage as starting material for the production of dental fillings and prosthesis devices is described in United States application Ser. No. 439,082 filed March 11, 1965.

The following examples are given merely for the purpose of illustrating the invention and are not to be considered as an express or implied limitation thereof.

EXAMPLE 1

Preparation of a filling

Over the prepared cavity in a tooth, a so-called matrix strip having a perforation over the cavity is firmly applied. A polycarbonate granulate from 2,2-bis-(4-hydroxyphenyl)-propane (relative viscosity 1.32, measured in a 0.5% methylene chloride solution at 20° C.), prepared by introducing filamentized short glass fiber containing a water-sizing agent into a solution of the polycarbonate in methylene chloride, removing the solvent and thereafter extruding the mixture, containing 30 percent by weight of originally water-sized milled glass fiber material and tooth-colored, is melted in an injection moulding apparatus of suitably small dimensions, and the melt is injected at a temperature of 220 to 350° C., preferably about 300° C. into the cavity through the perforation hole of the matrix. The synthetic resin solidifies immediately, the matrix strip can be taken off and the surface of the filling finished, if necessary. The filling has the advantageous properties described above.

EXAMPLE 2

Production of a denture

A denture made in the usual manner with porcelain teeth in wax is introduced into a dental mould and provided with an injection moulding channel in such a manner that the corresponding hollow mould is obtained after the wax has been scalded. This hollow plaster mould is pre-dried at 80–100° C. and optionally provided with an insulating film of alginate, water glass or silicone rubber. The gum-like colored melt of a mixed carbonate from 2,2-bis-(4-hydroxyphenyl)-propane and 1,1-bis-(4-hydroxyphenyl)-cyclohexane (relative viscosity 1.25, measured in a 0.5% methylene chloride solution at 20° C.) in which 15 percent by weight of glass fibers are uniformly distributed, said fibers having been originally provided with a polycarbonate size and having a length of about 0.2 mm. is injected at about 320° C. and under a pressure of 3 atmospheres into the hollow mould by means of a suitably adapted injection moulding apparatus. After removal from the plaster mould, a denture with the excellent properties mentioned above is obtained.

We claim:

1. A dental prosthesis device including an injection-molded, finished structural element having a smooth surface, said element being composed of a thermoplastic, high molecular weight polycarbonate derived from aromatic dihydroxy compounds, said element containing from 5 to 40 weight percent of presized glass fibers distributed uniformly throughout said polycarbonate, said fibers having been presized with a thermoplastic high molecular weight polycarbonate or water and having a length between about 0.2 to about 3 mm.

2. The dental prosthesis device according to claim 1 wherein the thermoplastic, high molecular weight polycarbonate is derived from di-monohydroxy diarylene-alkane.

3. The dental prosthesis device according to claim 1 wherein the polycarbonate derived from aromatic dihydroxy compounds has a relative viscosity of between about 1.2 and about 1.4 measured in a 0.5% methylene chloride solution at 20° C.

4. The dental prosthesis device according to claim 1 wherein the polycarbonate is derived from 2,2-bis-(4-hydroxyphenyl)-propane.

5. The dental prosthesis device according to claim 1 wherein the polycarbonate is a mixed polycarbonate derived from 2,2-bis-(4-hydroxyphenyl)-propane and 1,1-bis-(4-hydroxyphenyl)-cyclohexane.

6. The dental prosthesis device according to claim 1 wherein the glass fibers are water-sized filamented milled glass fibers.

7. The dental prosthesis device according to claim 1 wherein the polycarbonate is derived from 2,2-bis-(4-hydroxyphenyl)-propane, the glass fiber is present in an amount of about 10 percent by weight and has been presized with water, and the glass fiber has a length of about 0.2 mm.

8. A finished dental filling having a smooth exposed surface composed of a thermoplastic, high molecular weight polycarbonate derived from aromatic dihydroxy compounds, said filling containing from 5 to 40 weight percent of presized glass fibers uniformly distributed throughout said polycarbonate, said fibers having been presized with a thermoplastic high molecular weight polycarbonate or water and having a length between about 0.2 to about 3 mm.

9. The dental filling according to claim 8 wherein the polycarbonate derived from aromatic dihydroxy compounds has a relative viscosity of between about 1.2 and about 1.4 measured in a 0.5% methylene chloride solution at 20° C.

10. A method of producing a dental prosthesis device including a finished structural element having a smooth surface comprising injecting into a mold having the configuration of said structural element a melted dental material composed of a thermoplastic, high molecular weight polycarbonate derived from aromatic dihydroxy compounds, said polycarbonate containing a uniform distribution of from 5 to 40 weight percent of presized glass fibers, said fibers having been presized with a thermoplastic high molecular weight polycarbonate or water, and having a length between about 0.2 to about 3 mm., cooling, removing the dental material from the mold and finishing the surface of the element to provide it with a smooth surface.

11. The method according to claim 10 wherein the melted polycarbonate has a relative viscosity of between about 1.2 and about 1.4 measured in a 0.5% methylene chloride solution at 20° C.

12. A method of filling a cavity in a tooth comprising injecting into said cavity a dental filling material composed of melted thermoplastic, high molecular weight polycarbonate derived from aromatic dihydroxy compounds, said polycarbonate containing a uniform distribution of from 5 to 40 weight percent of presized glass fibers, said fibers having been presized with a thermoplastic high molecular weight polycarbonate or water and having a length of about 0.2 to about 3 mm., allowing the material to cool and then finishing the exposed surface of the material to provide a smooth surface.

13. The method according to claim 12 wherein the melted polycarbonate has a relative viscosity of between about 1.2 and about 1.4 measured in a 0.5% methylene cholride solution at 20° C.

References Cited

UNITED STATES PATENTS

| 2,477,268 | 7/1949 | Saffir. |
| 3,164,563 | 1/1965 | Maxwell. |

FOREIGN PATENTS

| 1,120,779 | 7/1956 | France. |
| 647,012 | 8/1962 | Canada. |

OTHER REFERENCES

Polycarbonates, Christopher, W. F. and Fox, D. W., 1962, Reinhold Publ. Corp., N.Y., pp. 151 and 154 relied on.

F. BARRY SHAY, Primary Examiner

U.S. Cl. X.R.

32—15